United States Patent
McCulloch et al.

(10) Patent No.: US 10,266,113 B1
(45) Date of Patent: Apr. 23, 2019

(54) SAFETY APPARATUSES AND METHODS

(71) Applicants: LaSonya McCulloch, Shreveport, LA (US); Sha 'Michael Conway, Shreveport, LA (US)

(72) Inventors: LaSonya McCulloch, Shreveport, LA (US); Sha 'Michael Conway, Shreveport, LA (US)

( * ) Notice: Subject to any disclaimer, the term of this patent is extended or adjusted under 35 U.S.C. 154(b) by 0 days.

(21) Appl. No.: 15/644,979

(22) Filed: Jul. 10, 2017

(51) Int. Cl.
*B60Q 9/00* (2006.01)

(52) U.S. Cl.
CPC ..................... *B60Q 9/008* (2013.01)

(58) Field of Classification Search
CPC .................................... B60Q 9/008
USPC ........................................ 340/435
See application file for complete search history.

(56) References Cited

U.S. PATENT DOCUMENTS

| | | | | |
|---|---|---|---|---|
| 6,035,567 A | * | 3/2000 | Cameron | G09F 7/20 116/63 P |
| 6,633,240 B1 | * | 10/2003 | Sweatt | G08B 25/10 340/539.26 |
| 2005/0128105 A1 | * | 6/2005 | Green | B29C 39/10 340/944 |
| 2016/0294199 A1 | * | 10/2016 | Poffinbarger, II | H02J 7/0027 |

* cited by examiner

*Primary Examiner* — Jack K Wang
(74) *Attorney, Agent, or Firm* — R. Keith Harrison (57) ABSTRACT

Safety apparatuses may include an apparatus housing configured for deployment in the at least one protected area. A CPU may be provided in the apparatus housing. At least one power supply may interface with the CPU. At least one caution light may interface with the CPU. The at least one caution light may be provided on an exterior of the apparatus housing, whereby the CPU illuminates the at least one caution light and the at least one caution light notifies or alerts the drivers to the persons in the at least one protected area. Safety methods are also disclosed.

15 Claims, 13 Drawing Sheets

SAFETY APPARATUSES AND METHODS

FIELD

Illustrative embodiments of the disclosure relate to safety apparatuses and methods. More particularly, illustrative embodiments of the disclosure relate to safety apparatuses and methods which are suitable for notifying drivers to the possible presence of pedestrians and/or other persons at or near a bus stop or other protected area for safety purposes.

BACKGROUND

The background description provided herein is solely for the purpose of generally presenting the context of the illustrative embodiments of the disclosure. Aspects of the background description are neither expressly nor impliedly admitted as prior art against the claimed subject matter.

Each year over 100,000 children worldwide die due to road traffic accidents. Many of these accidents occur in route to and from school. While schools typically utilize safety lights and school zones with crossing guards, there does not exist safety lights at or near bus stops. Children may travel to and from their bus stops early in the morning, and frequently in the dark, without wearing any safety or reflective clothing. This may render it difficult for motorists to view them from a distance. For children aged 5-9 years, road traffic injuries are ranked as the $4^{th}$ leading factor for injuries and deaths. For children aged 15-17 years, road traffic injuries are ranked as the $1^{st}$ loading factor for injuries and death.

According to statistics from the U.S. Dept. of Justice, the average annual rate of workplace violence between 2005 and 2009 (5 violent crimes per 1,000 employed persons age 16 or older) was about one-third the rate of non-workplace violence (16 violent crimes per 1,000 employed persons aged 16 or older) and violence against persons not employed (17 violent crimes per 1,000 persons aged 16 or older). Between 2005 and 2009, law enforcement officers, security and bartenders had the highest rates of nonfatal workplace violence. About 70% of workplace homicides were committed by robbers and other assailants, while about 21% were committed by work associates between 2005 and 2009. While firearms were used in 5% of nonfatal workplace violence between those years, shootings accounted for 89% of workplace homicides.

Accordingly, safety apparatuses and methods which are suitable for notifying drivers to the possible presence of pedestrians and/or other persons at or near a bus stop or other protected area for safety purposes are needed.

SUMMARY

Illustrative embodiments of the disclosure are generally directed to safety apparatuses and methods which are suitable for notifying drivers to the possible presence of pedestrians and/or other persons at or near a bus stop or other protected area for safety purposes. An illustrative embodiment of the safety apparatuses may include an apparatus housing configured for deployment in the at least one protected area. A CPU may be provided in the apparatus housing. At least one power supply may interface with the CPU. At least one caution light may interface with the CPU. The at least one caution light may be provided on an exterior of the apparatus housing, whereby the CPU illuminates the at least one caution light and the at least one caution light notifies or alerts the drivers to the persons in the at least one protected area.

A method for notifying drivers to possible presence of persons at a bus stop in a protected area for safety purposes may include deploying at least one safety apparatus in at least one protected area; and energizing at least one caution light on the at least one safety apparatus. The at least one caution light increases awareness of drivers to pedestrians and/or other persons in the protected area.

BRIEF DESCRIPTION OF THE DRAWINGS

Illustrative embodiments of the disclosure will now be described, by way of example, by reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 6:
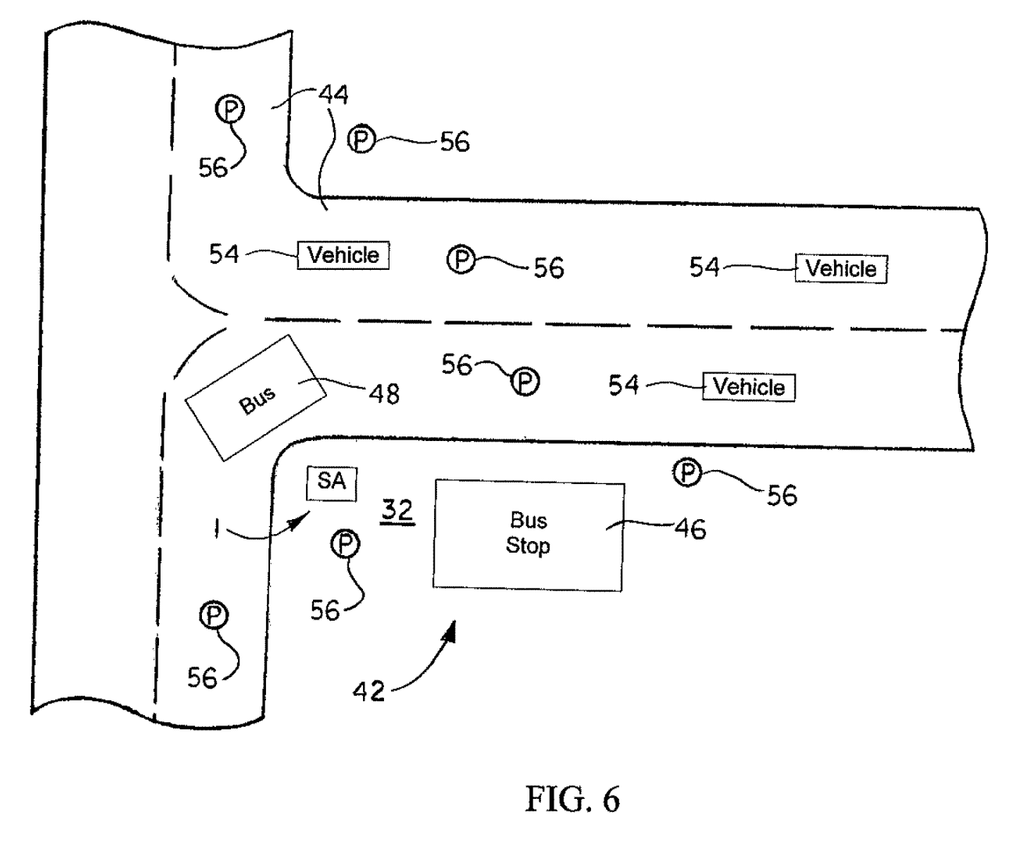
FIG. 6 is a schematic top view of a safety apparatus deployed at a bus top in typical application of the safety apparatus.
Figure 7:
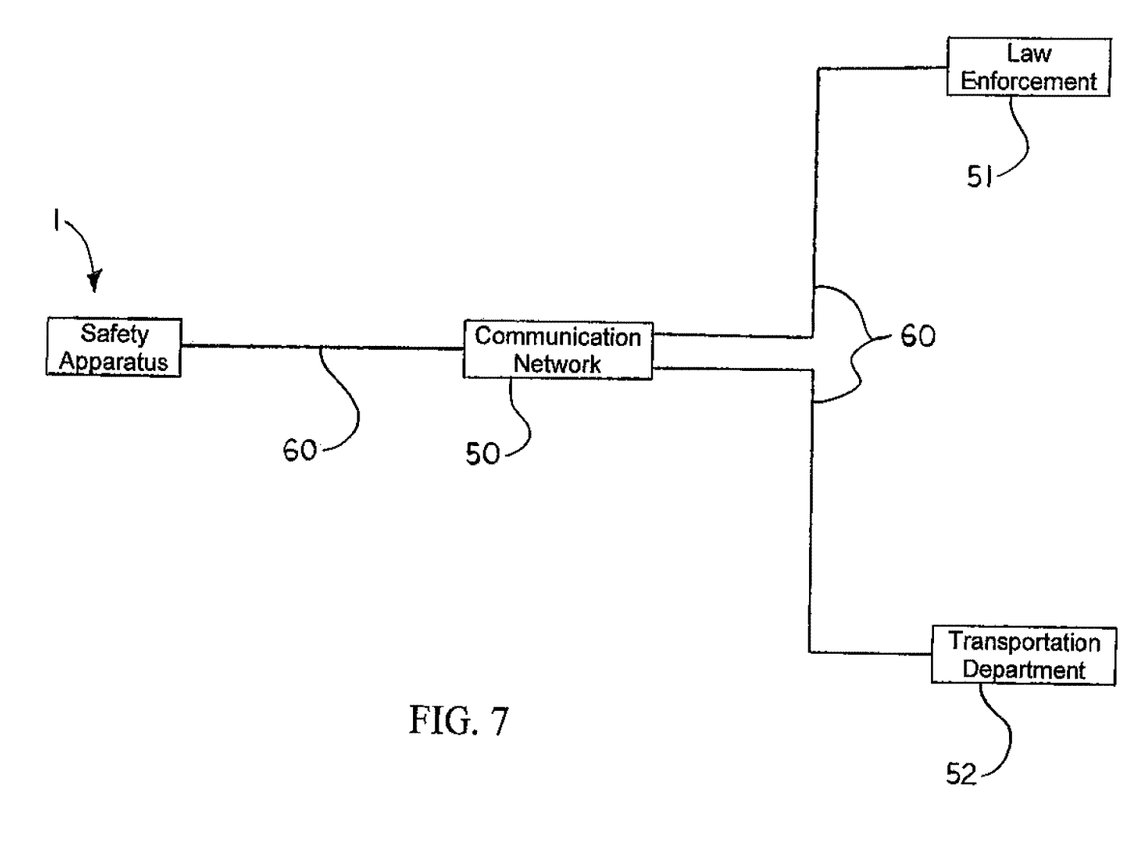
FIG. 7 is a schematic block diagram of a safety apparatus disposed in communication with a law enforcement agency and a transportation department through a communication network in typical application of the safety apparatus.

Referring initially to FIGS. 6 and 7 of the drawings, an illustrative embodiment of the safety apparatuses is generally indicated by reference numeral 1. As illustrated in FIG. 6 and will be hereinafter described, in some applications, at least one safety apparatus 1 may be placed in at least one protected area 42 to alert or notify drivers of vehicles 54 in or in proximity to the protected area 42 to the possible presence of pedestrians and/or other persons 56 in the protected area 42. In some applications, the protected area 42 may include a bus stop 46. The bus stop 46 may include a municipal bus stop or a school bus stop, for example and without limitation. The bus stop 46 may be located adjacent to a street 44. One or more of the safety apparatuses 1 may be placed adjacent to the street 44 at or in proximity to the bus stop 46. Accordingly, the safety apparatus 1 may notify or alert drivers of buses 48 and other vehicles 54 on the street 44 to the possible presence of the persons 56, who may cross the street 44 in order to access the bus stop 46 or wait at the bus stop 46 for a particular bus 48. The safety apparatus 1 may be rendered highly-visible to drivers of the vehicles 54 such that the drivers of the vehicles 54 will be more mindful to observe posted speed limits, practice vigilance and adjust driving habits to evade the persons 56 as the persons 56 cross the street 44 or walk adjacent to the street 44. In some embodiments, each safety apparatus 1 may be a standalone unit.

As illustrated in FIG. 7, in some embodiments, the safety apparatus 1 may interface with a law enforcement agency 51 typically through a communication network 50. Accordingly, in some applications of the safety apparatus 1, which will be hereinafter described, a person 56 may use the safety apparatus 1 to notify the law enforcement agency 51 in the event that the person 56 encounters potential danger at the protected area 42. The law enforcement agency 51 can then dispatch personnel to investigate the protected area 42. As used herein, "law enforcement" includes but is not limited to police, medical and other emergency services agencies or personnel such as 911 emergency services. The law enforcement agency 51 may include law enforcement personnel which utilize any combination of motor vehicles, self-driving or autonomous vehicles, water vehicles, airplanes, drones and helicopters, for example and without limitation.

As further illustrated in FIG. 7, in some embodiments, the safety apparatus 1 may interface with a transportation department 52 typically through the communication network 50. A person 56 may use the safety apparatus 1 to notify the transportation department 52 in order to check the in route status of a particular bus 48 which is to arrive at the bus slop 46, as will be hereinafter described. The transportation department 52 may include any department, agency, corporation, entity or combination thereof which handles transportation scheduling including scheduling of the buses 48 which stop at the bus stop 46 and may include federal, state and/or local entities.

Figure 1A:
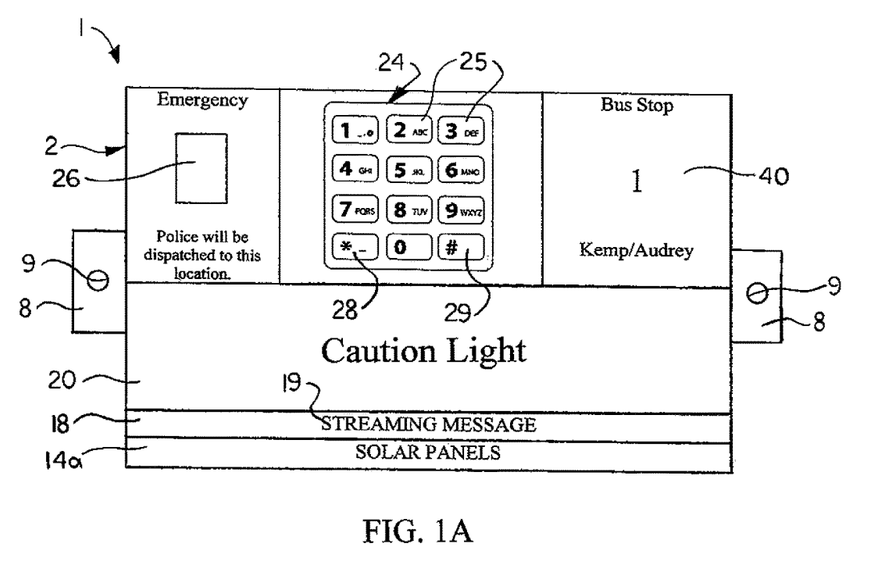
FIG. 1A is a schematic block diagram of an illustrative embodiment of the safety apparatuses.

Referring next to FIGS. 1A-5 of the drawings, an illustrative embodiment of the safety apparatuses is generally indicated by reference numeral 1. The safety apparatus 1 may include an apparatus housing 2. The apparatus housing 2 may contain or support the various functional components (FIG. 5) of the safety apparatus 1, which will be hereinafter described. As illustrated in FIG. 1B, in some embodiments, the apparatus housing 2 may include a housing bottom panel 3. Housing side panels 4 may extend from the housing bottom panel 3. A housing top panel 5 may be provided on the housing side panels 4. In some embodiments, housing mount flanges 8 may extend from the apparatus housing 2. Each of the housing mount flanges 8 may be provided with a flange opening 9 (FIG. 1A). Accordingly, fasteners 10 (FIG. 1B) may be extended through the respective flange openings 9 in the housing mount flanges 8 to facilitate mounting of the apparatus housing 2 on the ground 32 or other surface, as illustrated in FIG. 1B. Alternatively, as illustrated in FIGS. 1C and 1D, the apparatus housing 2 may be mounted on a lamppost 36 using clamps, brackets, mechanical fasteners and/or other techniques known by those skilled in the art (not illustrated).

Figure 5:
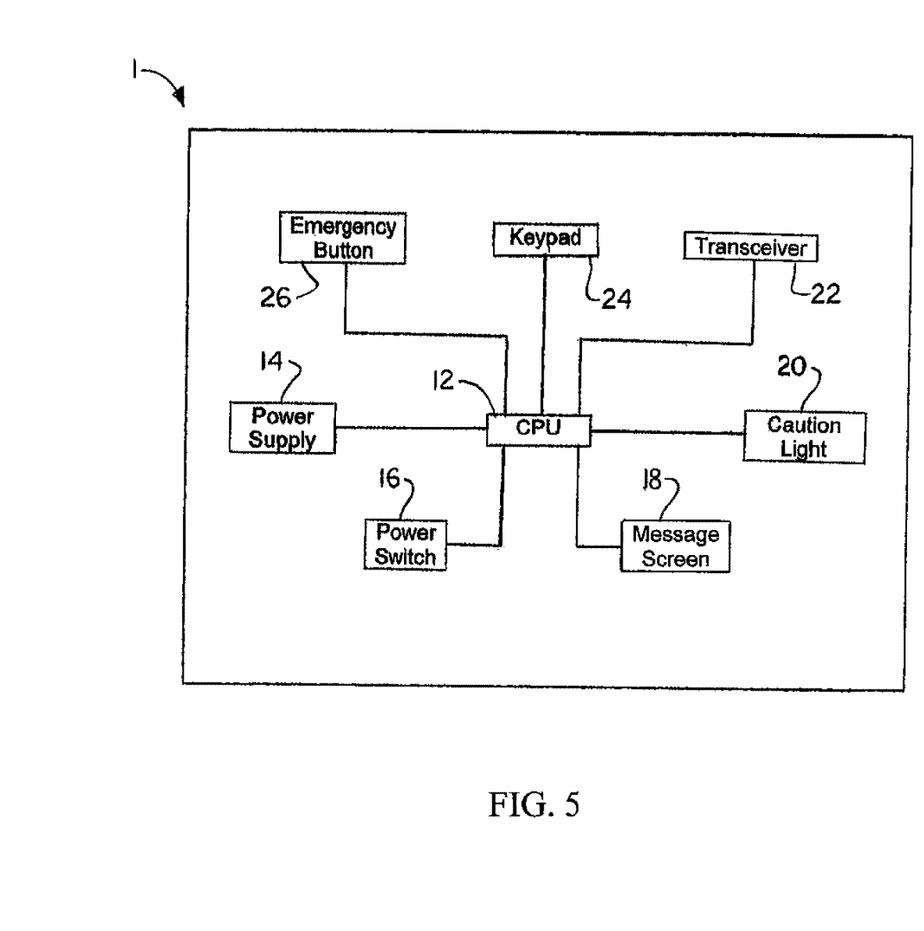
FIG. 5 is a schematic block diagram which illustrates typical functional components of an illustrative embodiment of the safety apparatuses.

As illustrated in FIG. 5, the safety apparatus 1 may include a CPU (Central Processing Unit) 12. The CPU 12 may include any electrical conduit, circuit, logic circuit, circuit board, chip and/or other component or series or combination of components which is/are capable of executing the various functions of the safety apparatus 1, which will be hereinafter described. At least one power supply 14 may interface with the CPU 12. In some embodiments, the power supply 14 may include at least one solar panel 14A, as illustrated in FIG. 1A. Additionally or alternatively, in other embodiments, the power supply 14 may include a designated municipal power source such as a 120-volt electrical source or at least one battery, for example, one without limitation.

A transceiver 22 may interface with the CPU 12. The transceiver 22 may facilitate transmission of communication signals (not illustrated) from and reception of communication signals by the safety apparatus 1. As illustrated in FIG. 7 and will be hereinafter further described, the CPU 12 (FIG. 5) may transmit communication signals 60 to the law enforcement agency 51 and/or a transportation department 52 typically through the communication network 50. The CPU 12 may additionally receive communication signals 60 from the law enforcement agency 51 and/or the transportation department 52 for purposes which will be hereinafter described.

The communication network 50 may include any system of hardware, software or combination of hardware and software which is suitable for the purpose of facilitating transfer of the communication signals 60 between the safety apparatus 1 and the law enforcement agency 51 and/or between the safety apparatus 1 and the transportation department 52. The communication network 50 may include any combination of a cellular telephone network, the Internet, satellite transmissions and telephone landlines, for example and without limitation.

A power switch 16 may interface with the CPU 12. The power switch 16 may facilitate selective activation of the safety apparatus 1. In some embodiments, the power switch 16 may be remotely activated such as through a wireless transmission mechanism (not illustrated) according to the knowledge of those skilled in the art. In some embodiments, the power switch 16 may be manually-activated and may be normally concealed in a locked compartment (not illustrated) which may be provided in or on the apparatus housing 2 and accessible by authorized personnel only.

A message screen 18 may interface with the CPU 12. The message screen 18 may be provided on the housing top panel 5 or in any other highly visible location on the exterior of the apparatus housing 2. As illustrated in FIG. 1A, in some embodiments, the CPU 12 (FIG. 5) may be configured to display a status message 19, which may be a streaming message and/or a static message, on the message screen 18 for purposes which will be hereinafter described. In some applications, the status message 19 may include one or more communications from the transportation department 52 (FIG. 7) concerning the in route status of a bus 48 (FIG. 6) which is destined for a bus stop 46, as will be hereinafter described.

Figure 1B:
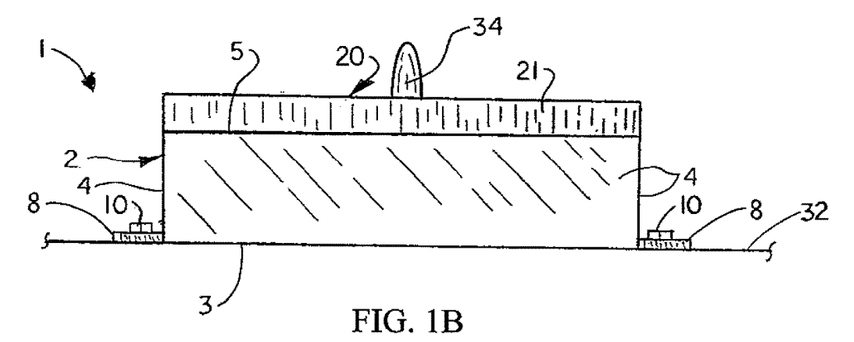
FIG. 1B is a side view of an illustrative safety apparatus.

As further illustrated in FIG. 5, at least one caution light 20 may interface with the CPU 12. The caution light 20 may be provided on the exterior of the apparatus housing 2. The caution light 20 may emit an amber, yellow, red and/or other highly visible colored light and may be provided in a highly visible location on the exterior of the apparatus housing 2, as illustrated in FIGS. 1A and 1B. In some embodiments, the caution light 20 may be provided on the housing top panel 5 of the apparatus housing 2. The caution light 20 may be suitably configured to emit a light beam (not illustrated) from the safety apparatus 1 upon illumination, according to the knowledge of those skilled in the art. The emitted light beam may be highly-visible to operators of buses 48 and other vehicles 54 from a distance.

Figure 2:
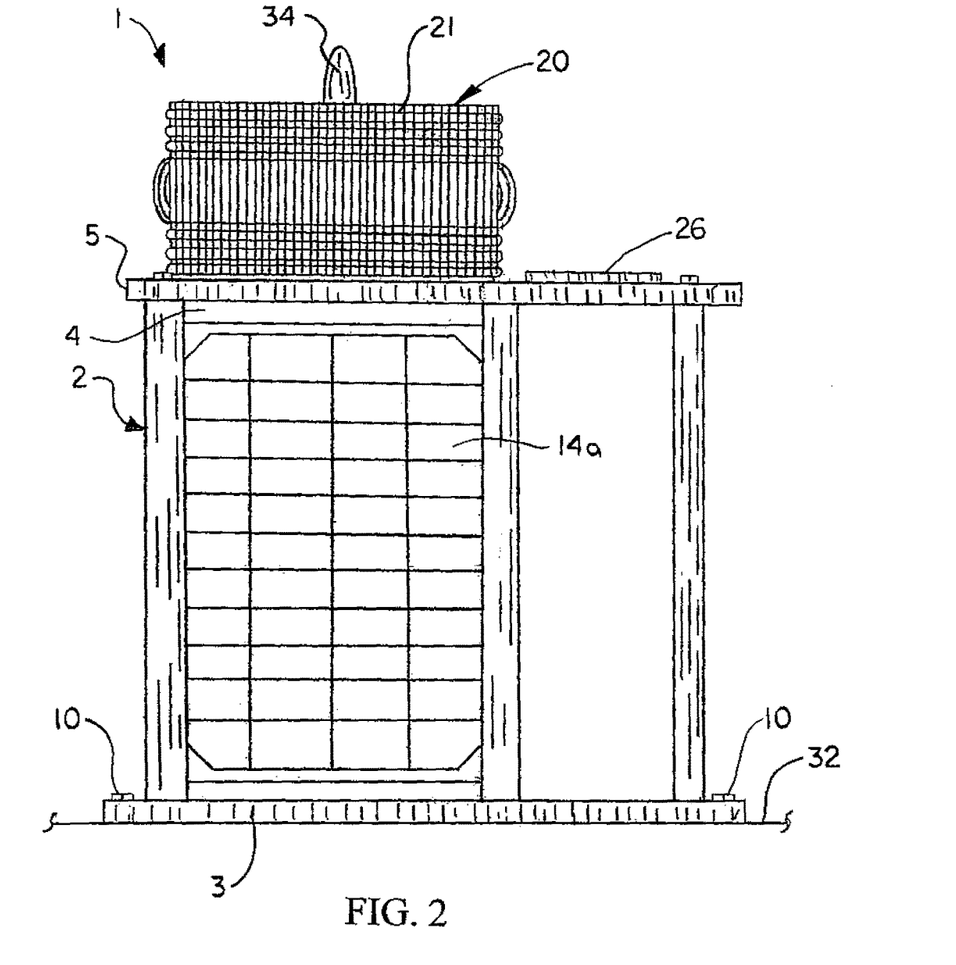
FIG. 2 is a front view of an illustrative embodiment of the safety apparatuses.
Figure 3:
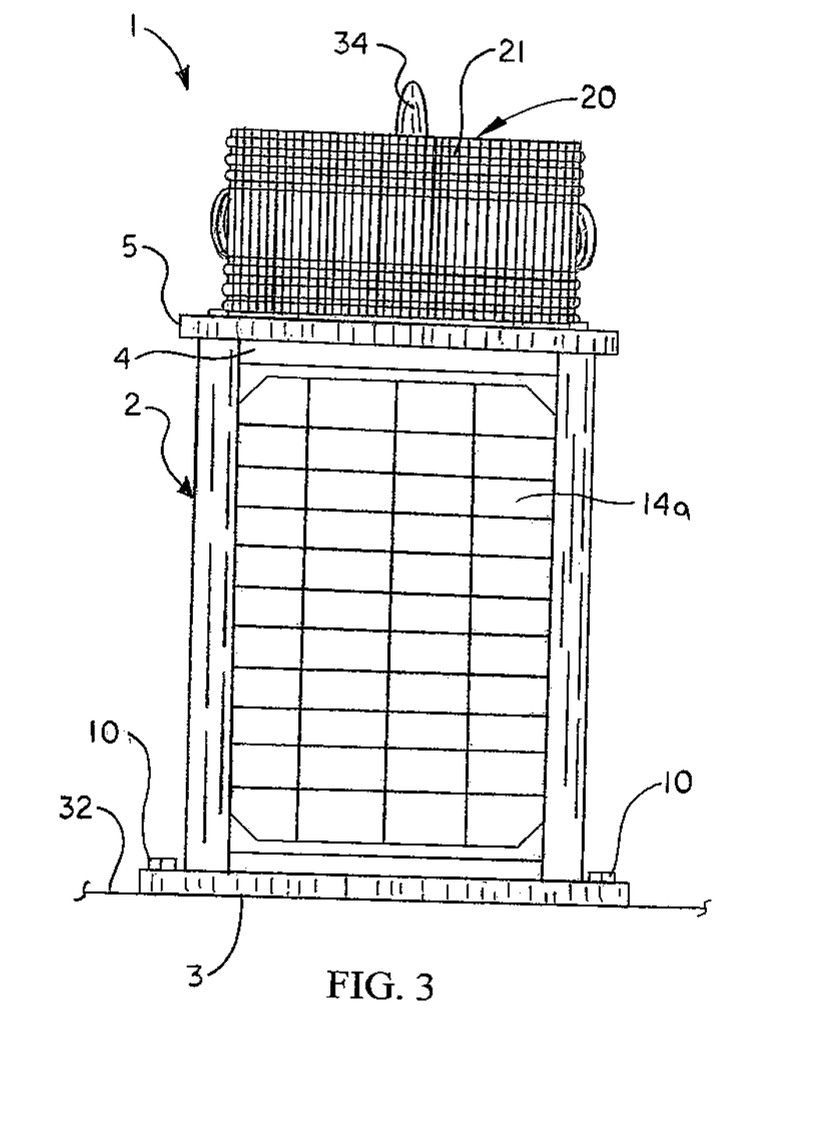
FIG. 3 is a side view of the illustrative safety apparatus illustrated in FIG. 2.
Figure 4:
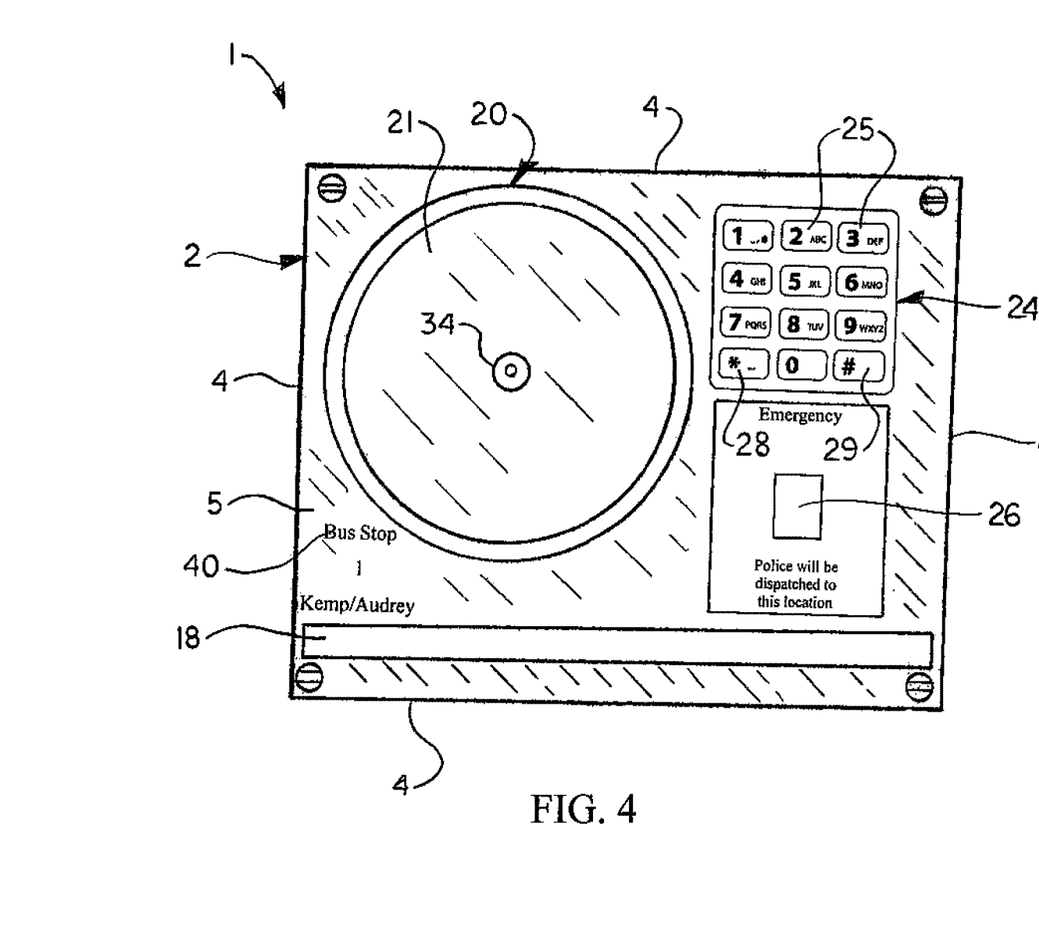
FIG. 4 is a top view of the illustrative safety apparatus illustrated in FIG. 2.

As illustrated in FIGS. 2-4, in some embodiments, the caution light 20 may include a light globe 21 which may protrude beyond an exterior surface of the apparatus housing 2 to enhance visibility of the caution light 20. As illustrated in FIG. 1B, at least one globe protrusion 34 may extend from the light globe 21. In typical application of the safety apparatus 1, which will be hereinafter described, the CPU 12 may be configured to energize and illuminate the caution light 20. The illuminated caution light 20 may alert motorists in the protected area 42 to the presence of one or more pedestrians and/or other persons 56 in or near the protected area 42.

As further illustrated in FIG. 5, at least one keypad 24 may interface with the CPU 12. As illustrated in FIG. 1A, in some embodiments, the keypad 24 may have a conventional keypad design typically with number keys 25, a star key 28 and a pound key 29. Additionally or alternatively, the keypad 24 may include a touchscreen which includes various user interface options for operation of the safety apparatus 1, as will be hereinafter described. Accordingly, in some applications of the safety apparatus 1, a person 56 (FIG. 6) in the protected area 42 may transmit a communication signal 60 (FIG. 7) to the transportation department 52 by entering the number of a delayed bus which is destined to arrive at the bust stop 46. The transportation department 52 may respond by transmitting a return communication signal 60 to the safety apparatus 1 which indicates the status of the delayed bus. The return communication signal 60 from the transportation department 52 may include a status message which indicates the ETA (Estimated Time of Arrival) of the delayed bus. The CPU 12 may display the status message on the message screen 18.

As further illustrated in FIG. 5, in some embodiments, an emergency button 26 may interface with the CPU 12. The CPU 12 may be configured to notify the law enforcement agency 51 typically through the communication network 50 via the communication signals 60, as illustrated in FIG. 7, responsive to actuation of the emergency button 26. The emergency button 26 may be provided on the housing top panel 5 or in any other visible and accessible location on the exterior of the apparatus housing 2. As further illustrated in FIG. 1A, identifying indicia 40 may be provided on the apparatus housing 2. The identifying indicia 40 may include such information as the bus stop number of the bus stop 46 at which the safety apparatus 1 is deployed as well as information as the street 44 or intersection of streets 44 where the safety apparatus 1 is deployed.

An illustrative embodiment of the safety apparatus 1 is illustrated in FIGS. 2-4 of the drawings. Accordingly, solar panels 14A may be provided on one or more of the housing side panels 4 of the apparatus housing 2. The caution light 20 may be provided on the housing top panel 5 of the apparatus housing 2. As illustrated in FIG. 4, the keypad 24, the emergency button 26 and the message screen 18 may be provided on the housing top panel 5, or additionally or alternatively, on one or more of the housing side panels 4. Accordingly, the keypad 24, the emergency button 26 and the message screen 18 may be readily viewable and accessible to persons 56 as the persons 56 typically wait for a bus 48 at the bus stop 46, in typical application of the safety apparatus 1 which will be hereinafter described.

Figure 1C:
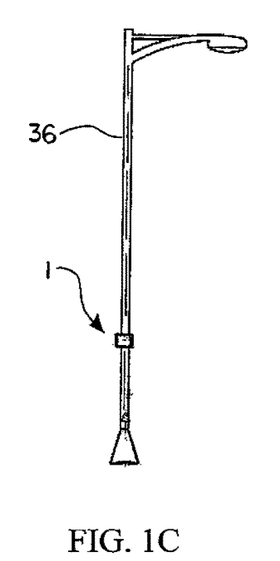
FIG. 1C is a side view of a typical lamppost, with an illustrative safety apparatus mounted on the lamppost in typical application.
Figure 1D:
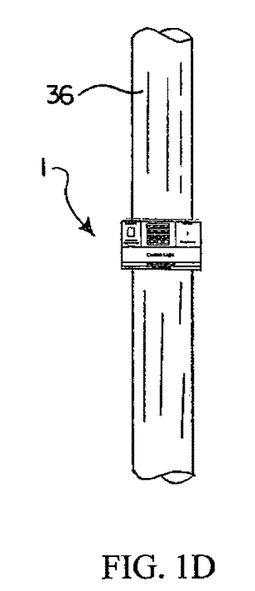
FIG. 1D is a front view of the illustrative safety apparatus illustrated in FIG. 1C, mounted on the lamppost (illustrated in section)

Referring next to FIGS. 1A, 6 and 7 of the drawings, in typical application, the safety apparatus 1 may be deployed at or in the vicinity of a bus stop 46 or other protected area 42, as illustrated in FIG. 6. The bus stop 46 may be located adjacent to a street 44 or an intersection of streets 44 each of which handles traffic typically including buses 48 as well as automobiles and other vehicles 54. The safety apparatus 1 may be secured to the ground 32, as illustrated in FIG. 1B, or alternatively, to a lamppost 36 or other vertical support, as illustrated in FIGS. 1C and 1D.

The satiety apparatus 1 may be activated by authorized personnel (not illustrated). In some applications, the safety apparatus 1 may be remotely activated wirelessly according to the knowledge of those skilled in the art, such as via activation signals (not illustrated) which may be transmitted to the CPU 12 (FIG. 5) typically via the transceiver 22. In other applications, the satiety apparatus 1 may be manually activated. Accordingly, the closed power switch 16 may facilitate flow of electrical current from the power supply 14 to the CPU 12. The CPU 12 may in turn energize or illuminate the caution light 20. The illuminated caution light 20 may visually alert or notify the operators of buses 48 and other vehicles 54 in or near the protected area 42 that pedestrians and/or other persons 56 are present in the area and may attempt to cross the street 44 to access the bus stop 46. Accordingly, the vehicle operators may adjust their speed, vigilance and driving habits to safely accommodate the potential crossing of the street 44 by the persons 56.

In the event that persons 56 who wait at the bus stop 46 for the arrival of a bus 48 which is delayed, one of the waiting persons 56 can enter the number of the delayed bus 48 typically using the number keys 25 on the keypad 24. Accordingly, the CPU 12 of the safety apparatus 1 may transmit a communication signal 60 (FIG. 7) to the transportation department 52, typically via the transceiver 22, and through the communication network 50. The transportation department 52 may, in response, transmit a return communication signal 60 back to the CPU 12 typically via the transceiver 22 and through the communication network 50. The return communication signal 60 from the transportation department 52 may include a status message which indicates the status of the bus 48 in question, including the ETA (Estimated Time of Arrival) of the bus 48 at the bus stop 46. The CPU 12 may display this information as a streaming or static status message 19 (FIG. 1A) on the message screen 18 of the safety apparatus 1.

In some applications, in the event that one of the persons 56 who waits for the bus 48 at the bus stop 46 feels endangered or is being bullied by another person 56 waiting for the bus 48, the person 56 who feels endangered may depress the emergency button 26 on the safety apparatus 1. Accordingly, the CPU 12 may transmit a communication signal 60 to the law enforcement agency 51 typically via the communication network 50. Accordingly, the communication signal 60 may notify the law enforcement agency 51 to the endangerment situation at the bus stop 46. The law enforcement agency 51 may then dispatch personnel to the bus stop 46 to resolve the endangerment situation. After or between uses of the safety apparatus 1, the caution light 20 may be extinguished typically in a remote manner or manually by actuation of the power switch 16.

Figure 8:
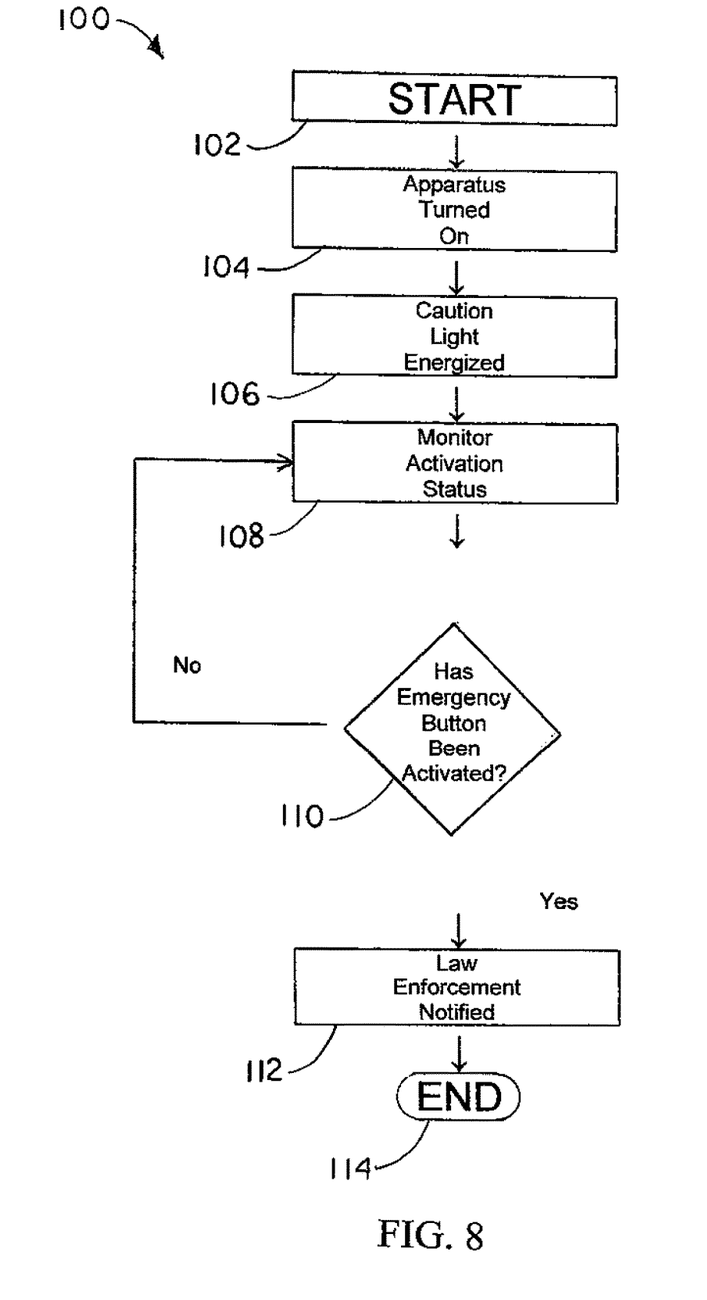
FIG. 8 is an operational algorithm which illustrates typical operation of an illustrative safety apparatus responsive to user activation of an emergency button on the apparatus.

Referring next to FIG. 8 of the drawings, an operational algorithm 100 which illustrates typical operation of an illustrative safety apparatus responsive to user activation of an emergency button on the apparatus is illustrated. The method may begin at Step 102. At Step 104, the apparatus may be turned on. At Step 106, the caution light may be energized. At Step 108, the activation status of the safety apparatus may be monitored. At Step 110, a query may be made as to whether the emergency button has been activated. If the emergency button has not been activated at Step 110, then the method may return to Step 108. If the emergency button has been activated at Step 110, then law enforcement may be notified at Step 112. The method may end at Step 114.

Figure 9:
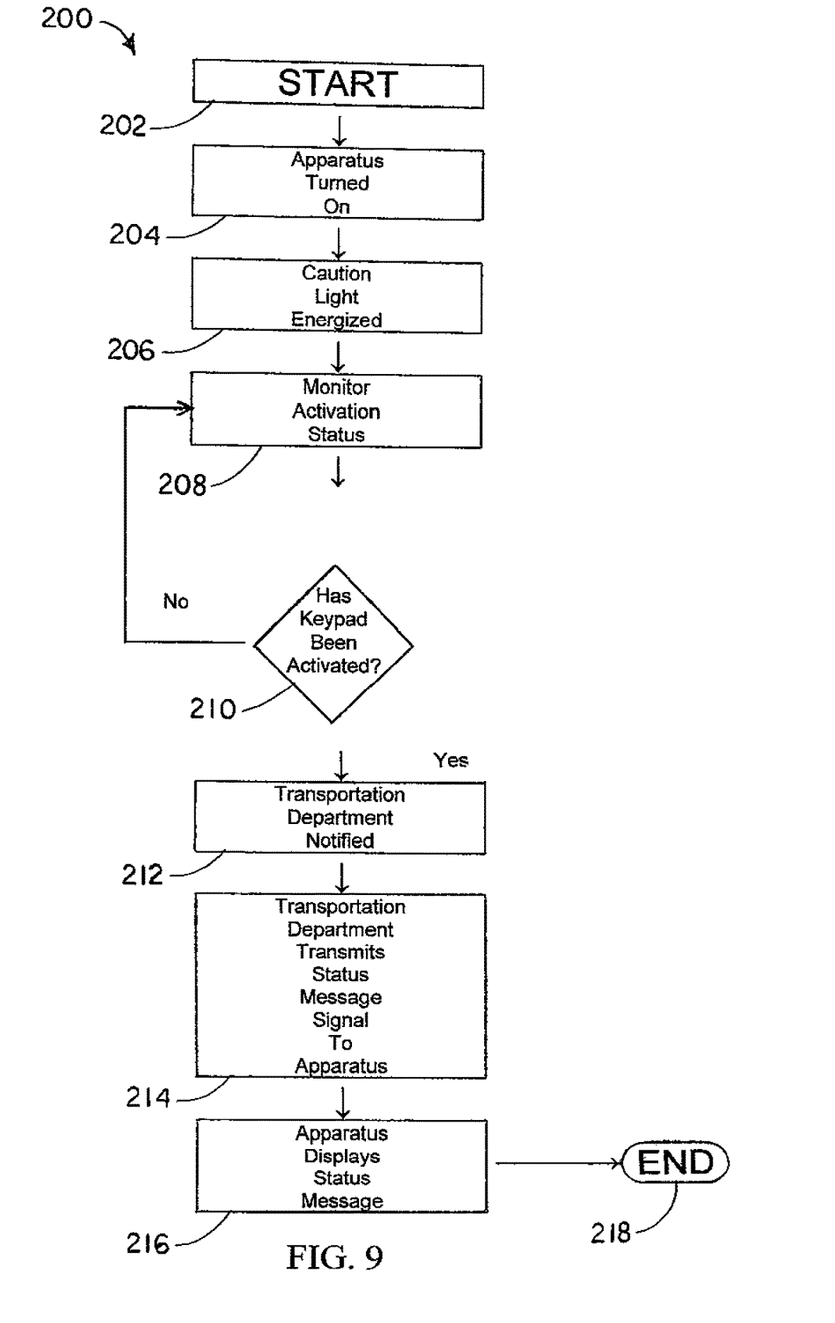
FIG. 9 is an operational algorithm which illustrates typical operation of an illustrative safety apparatus responsive to user activation of a keypad on the apparatus.

Referring next to FIG. 9 of the drawings, an operational algorithm 200 which illustrates typical operation of an illustrative safety apparatus responsive to user activation of a keypad on the apparatus is illustrated. The method may begin at Step 202. At Step 204, the apparatus may be turned on. At Step 206, the caution light may be energized. At Step 208, the activation status of the safety apparatus may be monitored. At Step 210, a query may be made as to whether the keypad has been activated. If the keypad has not been activated at Step 210, then the method may return to Step 208. If the keypad has been activated at Step 210, then at Step 212, a transportation department may be notified. At Step 214, the transportation department may transmit a status message signal to the apparatus. At Step 216, the apparatus may display the status message. At Step 218, the method may end.

Figure 10A:
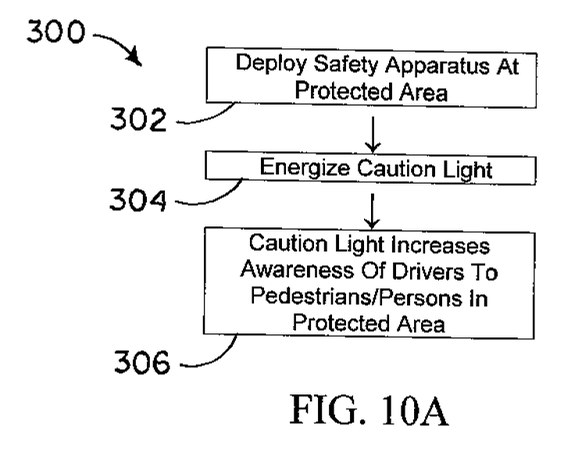
FIG. 10A is a flow diagram which illustrates typical implementation of an illustrative embodiment of the safety methods of the disclosure.

Referring next to FIG. 10A of the drawings, a flow diagram 300 which illustrates implementation of an illustrative embodiment of the safety methods of the disclosure is illustrated. At Step 302, at least one safety apparatus may be deployed in at least one protected area. In some applications, the protected area may include a school or municipal bus stop. At Step 304, a caution light on the safety apparatus may be energized. At Step 306, the caution light may increase the awareness of drivers to pedestrians and/or other persons in the protected area.

Figure 10B:
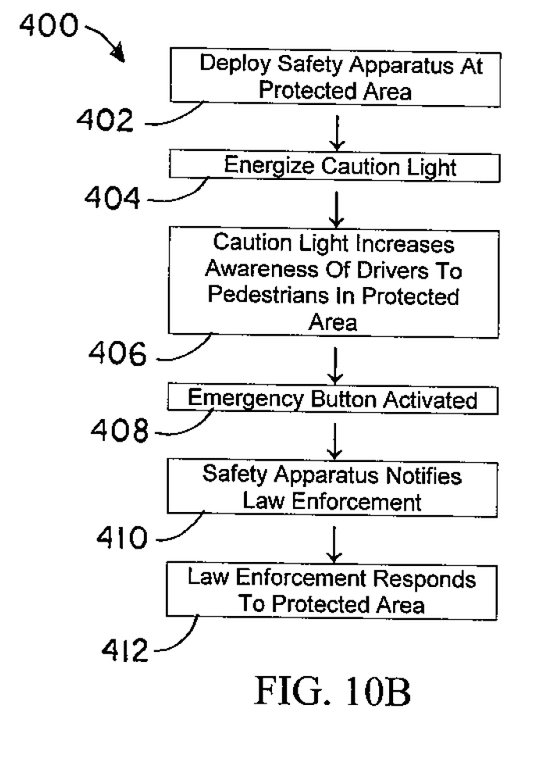
FIG. 10B is a flow diagram which illustrates typical implementation of an illustrative embodiment of the safety methods of the disclosure responsive to user activation of an emergency button on the apparatus.

Referring next to FIG. 10B of the drawings, a flow diagram 400 which illustrates implementation of an illustrative embodiment of the safety methods of the disclosure in activation of an emergency button is illustrated. At Step 402, at least one safety apparatus may be deployed in at least one protected area. In some applications, the protected area may include a school or municipal bus stop. At Step 404, a caution light on the safety apparatus may be energized. At Step 406, the caution light may increase the awareness of drivers to pedestrians and/or other persons in the protected area. At Step 408, an emergency button on the safety apparatus may be activated. At Step 410, the safety apparatus may notify law enforcement. At Step 412, law enforcement may respond to the protected area.

Figure 10C:
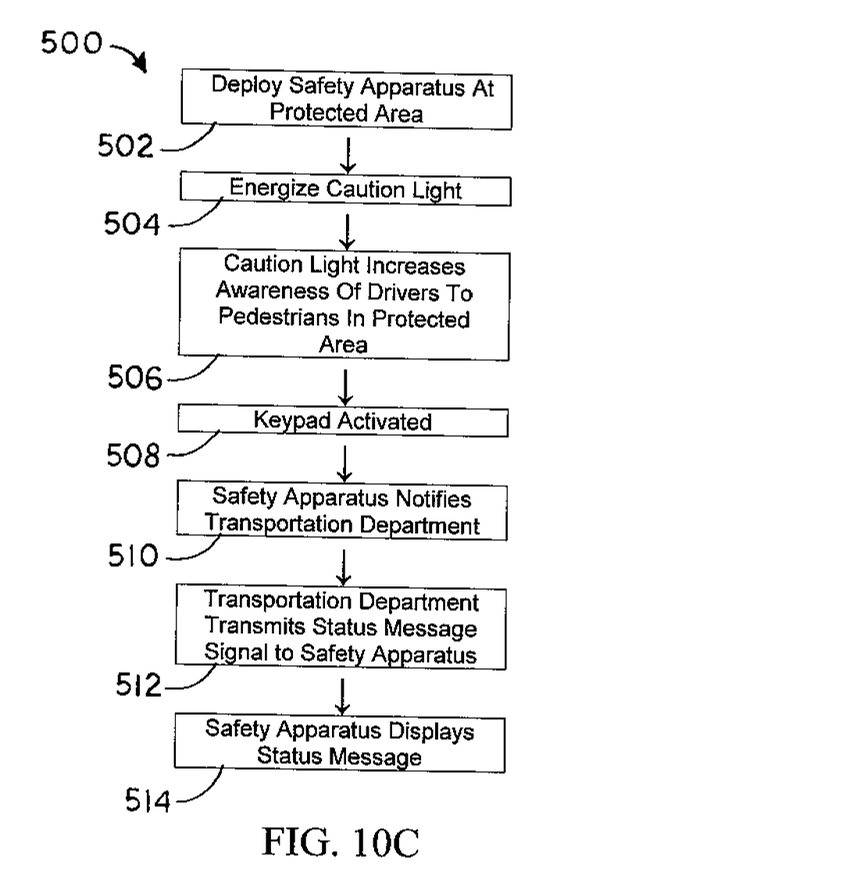
FIG. 10C is a flow diagram which illustrates typical implementation of an illustrative embodiment of the safety methods of the disclosure responsive to user activation of a keypad on the apparatus.

Referring next to FIG. 10C of the drawings, a flow diagram 500 which illustrates implementation of an illustrative embodiment of the safety methods of the disclosure in activation of a keypad is illustrated. At Step 502, at least one safety apparatus may be deployed in at least one protected area. In some applications, the protected area may include a school or municipal bus stop. At Step 504, a caution light on the safety apparatus may be energized. At Step 506, the caution light may increase the awareness of drivers to pedestrians and/or other persons in the protected area. At step 508, a keypad on the apparatus may be activated. At step 510, the safety apparatus may notify a transportation department. At step 512, the transportation department may transmit a status message signal to the safety apparatus. At step 514, the safety apparatus may display the status message.

It will be appreciated by those skilled in the art that the safety apparatuses of the disclosure may eliminate or substantially reduce traffic-related and workplace-related injuries. The safety apparatuses may additionally serve as a personal safety and crime prevention mechanism for federal, state and commercial businesses. The safety apparatuses may facilitate communication between public, private, city or commercial transportation departments and emergency or law enforcement services such as 911. The safety apparatuses may facilitate communication between motor vehicles, self-driving or autonomous vehicles, water vehicles, airplanes, drones, helicopters and the like.

The safety apparatuses may be used as a safety and/or emergency device in any of a variety of applications including but not limited to traffic applications, construction applications, around public and private buildings and on roads, military bases and carriers, oil and gas fields, airports, shopping malls and centers, hospitals and around traffic accidents, emergency roadside assistance, cattle crossings, parades, revels and festivals, airport crossings. Olympic games and venues, construction zones, playgrounds, amusement parks, weddings, funerals, charity events and races, church events, sporting events and venues, school activities (primary, secondary and college), manufacturing and chemical plants, water sports and events and the movie industry. The safety apparatuses may be used to increase awareness of motorists, pilots and autonomous vehicles aware of pedestrian traffic.

It will be further appreciated by those skilled in the art that numerous variations of the safety apparatuses 1 are possible. For example and without limitation, in some embodiments, a microphone (not illustrated) may interface with the CPU 12. The CPU 12 may be configured to transmit voice messages from a person 56 at the protected area 42 to the law enforcement agency 51, the transportation department 52 and/or other entity. The CPU 12 may be additionally configured to receive voice messages from personnel at the law enforcement agency 51, the transportation department 52 and/or other entity in response to the voice messages from the person 56. Thus, the safety apparatus 1 may facilitate real-time communication between the person 56 and the law enforcement agency 51, transportation department 52 or other agency as may be deemed necessary by the circumstances.

While illustrative embodiments of the disclosure have been described above, it will be recognized and understood that various modifications can be made and the appended claims are intended to cover all such modifications which may fall within the spirit and scope of the disclosure.

What is claimed is:

1. A safety apparatus for notifying drivers to possible presence of persons in at least one protected area for safety purposes, comprising:
   an apparatus housing configured for deployment in the at least one protected area;
   a CPU in the apparatus housing;
   at least one power supply interfacing with the CPU;
   at least one caution light interfacing with the CPU, the at least one caution light provided on an exterior of the apparatus housing, whereby the CPU illuminates the at least one caution light and the at least one caution light notifies or alerts the drivers to the persons in the at least one protected area;
   at least one keypad interfacing with the CPU, the at least one keypad provided on the exterior of the apparatus housing, the CPU configured to notify a transportation department upon entry of a number of a delayed vehicle destined to arrive at the protected area into the at least one keypad; and
   at least one message screen interfacing with the CPU, the at least one message screen provided on the exterior of the apparatus housing, the CPU configured to display at least one status message from the transportation department on the at least one message screen, the at least one status message includes an en route status of the delayed vehicle destined for the at least one protected area.

2. The safety apparatus of claim 1 wherein the at least one power supply comprises at least one solar panel on the exterior of the apparatus housing.

3. The safety apparatus of claim 1 wherein the at least one caution light comprises a light globe.

4. The safety apparatus of claim 3 further comprising at least one globe protrusion extending from the light globe.

5. The safety apparatus of claim 1 further comprising a power switch interfacing with the CPU, the power switch configured to facilitate selective activation of the at least one caution light.

6. The safety apparatus of claim 1 further comprising an emergency button interfacing with the CPU, the emergency button provided on the exterior of the apparatus housing, the CPU configured to notify a law enforcement agency upon manipulation of the emergency button.

7. A safety apparatus for notifying drivers to possible presence of persons at a bus stop in a protected area for safety purposes, comprising:
   an apparatus housing configured for deployment in the at least one protected area;
   a CPU in the apparatus housing;
   at least one power supply interfacing with the CPU;
   at least one caution light interfacing with the CPU, the at least one caution light provided on an exterior of the apparatus housing, whereby the CPU illuminates the at least one caution light and the at least one caution light notifies or alerts the drivers to the persons in the at least one protected area;
   an emergency button interfacing with the CPU, the emergency button provided on the exterior of the apparatus housing, the CPU configured to notify a law enforcement agency upon manipulation of the emergency button;
   at least one keypad interfacing with the CPU, the at least one keypad provided on the exterior of the apparatus housing, the CPU configured to notify a transportation department upon entry of a number of a delayed bus destined to arrive at the bus stop into the at least one keypad; and
   at least one message screen interfacing with the CPU, the at least one message screen provided on the exterior of the apparatus housing the CPU configured to display at least one status message from the transportation department on the at least one message screen, the at least one status message includes an on route status of the delayed bus destined for the at least one protected area.

8. The safety apparatus of claim 7 wherein the at least one power supply comprises at least one solar panel on the exterior of the apparatus housing.

9. The safety apparatus of claim 7 wherein the at least one caution light comprises a light globe.

10. The safety apparatus of claim 9 further comprising at least one globe protrusion extending from the light globe.

11. The safety apparatus of claim 7 further comprising a power switch interfacing with the CPU, the power switch configured to facilitate selective activation of the at least one caution light.

12. A method for notifying drivers to possible presence of persons at at least one protected area for safety purposes, comprising:
   deploying at least one safety apparatus in at least one protected area;
   energizing at least one caution light on the at least one safety apparatus, the at least one caution light increases awareness of drivers to pedestrians and/or other persons in the protected area;
   notifying a transportation department by entry of a number of a delayed vehicle destined to arrive at the protected area into at least one keypad on the at least one safety apparatus; and
   displaying at least one status message from the transportation department on the at least one safety apparatus, the at least one status message includes an en route status of the delayed vehicle destined for the protected area.

13. The method of claim 12 wherein deploying at least one safety apparatus in at least one protected area comprises deploying the at least one safety apparatus at a bus stop in the at least one protected area.

14. The method of claim 12 further comprising notifying a law enforcement agency by activation of the at least one safety apparatus.

15. The method of claim 12 wherein displaying the at least one status message from the transportation department on the at least one safety apparatus comprises indicating the at least one status message on at least one message screen on the at least one safety apparatus.

* * * * *